United States Patent
Hu et al.

(10) Patent No.: US 10,719,005 B2
(45) Date of Patent: Jul. 21, 2020

(54) PROJECTION SCREEN AND MANUFACTURING METHOD THEREFOR

(71) Applicant: APPOTRONICS CORPORATION LIMITED, Shenzhen, Guangdong (CN)

(72) Inventors: Fei Hu, Shenzhen (CN); Hongxiu Zhang, Shenzhen (CN); Zuqiang Guo, Shenzhen (CN); Yi Li, Shenzhen (CN)

(73) Assignee: Appotronics Corporation Limited, Shenzhen, Guangdong (CN)

( * ) Notice: Subject to any disclaimer, the term of this patent is extended or adjusted under 35 U.S.C. 154(b) by 0 days.

(21) Appl. No.: 16/466,631

(22) PCT Filed: Nov. 3, 2017

(86) PCT No.: PCT/CN2017/109316
§ 371 (c)(1),
(2) Date: Aug. 8, 2019

(87) PCT Pub. No.: WO2018/103480
PCT Pub. Date: Jun. 14, 2018

(65) Prior Publication Data
US 2019/0354002 A1  Nov. 21, 2019

(30) Foreign Application Priority Data
Dec. 5, 2016 (CN) .......................... 2016 1 1104414

(51) Int. Cl.
*G03B 21/625* (2014.01)
*G02B 3/08* (2006.01)
(Continued)

(52) U.S. Cl.
CPC ......... *G03B 21/625* (2013.01); *G02B 3/0056* (2013.01); *G02B 3/08* (2013.01);
(Continued)

(58) Field of Classification Search
CPC .... G03B 21/602; G03B 21/625; G03B 21/60; G03B 21/62; G02B 3/0056
(Continued)

(56) References Cited

U.S. PATENT DOCUMENTS 3,893,748 A * 7/1975 De Palma .............. G03B 21/60
                                                 359/455
6,023,369 A * 2/2000 Goto .................... G03B 21/602
                                                 359/443
(Continued)

FOREIGN PATENT DOCUMENTS

CN       1285528 A    2/2001
CN       101510045 A  8/2009
(Continued)

OTHER PUBLICATIONS

International Search Report of PCT Application PCT/CN2017/109316—4 pages (dated Feb. 2, 2018).
(Continued)

*Primary Examiner* — Clayton E. LaBalle
*Assistant Examiner* — Kevin C Butler
(74) *Attorney, Agent, or Firm* — Knobbe, Martens, Olson & Bear, LLP

(57) ABSTRACT

Provided is a projection screen. The screen includes: a base layer; a cylindrical lens layer formed on a side of the base layer close to a viewer, a Fresnel structure formed on a side of the base layer facing away from the viewer, a reflective layer formed on a side of the Fresnel structure facing away from the base layer, including reflective particles and configured to scatter and reflect, in a solid angle range corresponding to a particle size of the reflective particles, incident light incident from the Fresnel structure, to form reflected light; and a light-absorbing layer formed on a side of the reflective layer facing away from the Fresnel structure. The
(Continued)

cylindrical lens layer includes a plurality of cylindrical lenses each having an axis perpendicular to a horizontal direction, and scatters light from the Fresnel structure to increase a viewing angle in the horizontal direction.

18 Claims, 7 Drawing Sheets

(51) Int. Cl.
  *G03B 21/602* (2014.01)
  *G02B 3/00* (2006.01)
  *G03B 21/60* (2014.01)
  *G03B 21/62* (2014.01)
  *G02B 1/10* (2015.01)
  *G02B 5/02* (2006.01)

(52) U.S. Cl.
  CPC ........... *G03B 21/60* (2013.01); *G03B 21/602* (2013.01); *G03B 21/62* (2013.01); *G02B 1/10* (2013.01); *G02B 5/0294* (2013.01)

(58) Field of Classification Search
  USPC ............................................. 359/455
  See application file for complete search history.

(56) References Cited

U.S. PATENT DOCUMENTS

| | | | | |
|---|---|---|---|---|
| 6,424,463 B1* | 7/2002 | Nishitani | ............... | G03B 21/60 359/449 |
| 7,139,123 B2* | 11/2006 | Chubachi | ................. | G02B 3/08 359/449 |
| 7,349,154 B2* | 3/2008 | Aiura | ..................... | G03B 21/56 359/449 |
| 7,646,536 B2* | 1/2010 | Fujita | ..................... | G03B 21/60 359/459 |
| 8,115,997 B1* | 2/2012 | Chien | ................. | G03B 21/602 359/459 |
| 9,057,941 B2* | 6/2015 | Nho | ........................ | G03B 21/60 |
| 9,285,669 B2* | 3/2016 | Sadahiro | ................ | G03B 21/60 |
| 2003/0039030 A1* | 2/2003 | Myers | .................... | G03B 21/56 359/449 |
| 2009/0225417 A1 | 9/2009 | Akiyama | | |
| 2010/0097699 A1* | 4/2010 | Destain | .................. | G03B 21/60 359/454 |
| 2010/0103514 A1* | 4/2010 | Chou | ..................... | G03B 21/56 359/449 |
| 2014/0036359 A1* | 2/2014 | Jeon | ....................... | G03B 21/60 359/459 |
| 2014/0092471 A1 | 4/2014 | Sadahiro et al. | | |
| 2015/0286125 A1 | 10/2015 | Powell | | |

FOREIGN PATENT DOCUMENTS

| | | |
|---|---|---|
| CN | 102243430 A | 11/2011 |
| CN | 104777708 A | 7/2015 |
| JP | 2014-052556 A | 3/2014 |
| WO | 2015/122055 A1 | 8/2015 |

OTHER PUBLICATIONS

Extended European Search Report of corresponding Patent Application No. 17877997.1—8 pages (dated Oct. 18, 2019).

* cited by examiner

PROJECTION SCREEN AND MANUFACTURING METHOD THEREFOR

CROSS-REFERENCE TO RELATED APPLICATIONS

The present application is a national phase application of International Application No. PCT/CN2017/109316 filed on Nov. 3, 2017, which claims priority to Chinese Patent Application No. 201611104414.4, filed on Dec. 5, 2016, the contents of each of which are incorporated herein by reference in its entirety and made a part of this specification.

TECHNICAL FIELD

The present disclosure relates to a projection screen and a manufacturing method therefor.

BACKGROUND

Currently, projectors have been widely used as image projection devices to project images on projection screens. Generally, a projector displays a color image by converging light emitted from a light source onto a spatial light modulator such as a DMD (Digital Micromirror Device) or a Lcos.

In recent years, a projection system in which a distance between a projector and a screen is 50 cm has been developed, which can achieve image projection display of a screen larger than 100 inches. In the projection system, since the projection screen fixed to a wall is arranged to be closer to a projector including a light source device, it is possible to overcome limitation of installation space, so that an image projection display of a large screen larger than 100 inches can be achieved within a short distance of 50 cm.

Technical Problems

However, in the above projection system, since there is a shorter distance between the projector and the projection screen, its projection screen tends to cause projection light emitted by the projector to have a larger incidence angle relative to the projection screen, compared with the conventional projection system. Thus, in response to large incidence angles and requirements for higher image quality, reflective projection screens can be employed, and how to provide and produce a reflective projection screen having high light utilization rate, good uniformity, easy operation and low cost is a subject worthy of study.

SUMMARY

Solutions to the Problems

Technical Solutions to the Problems

In view of the above, it is necessary to provide a reflective projection screen having advantages of high light utilization rate, good uniformity, easy operation and low cost, and a manufacturing method therefor.

A projection screen for receiving projection light from a projector and providing a projected image to a viewer. The projection screen includes a base layer, a cylindrical lens layer formed on a side of the base layer close to the viewer, a Fresnel structure formed on a side of the base layer facing away from the viewer, a reflective layer formed on a side of the Fresnel structure facing away from the base layer, and a light-absorbing layer formed on a side of the reflective layer facing away from the Fresnel structure. The reflective layer includes reflective particles and a binder bonded to the reflective particles. The reflective layer is configured to scatter and reflect, in a solid angle range corresponding to a particle size of the reflective particles, incident light incident from the Fresnel structure, to form reflected light. The cylindrical lens layer includes a plurality of cylindrical lenses each having an axis perpendicular to a horizontal direction and scattering light from the Fresnel structure to increase a viewing angle of the projection screen in the horizontal direction. The light-absorbing layer is configured to absorb ambient light transmitted through the reflective layer.

In one embodiment, the particle size of the reflective particles is in a range of 0.02 μm to 5 μm, and the solid angle varies correspondingly in a range of 5 degrees to 15 degrees.

In one embodiment, the reflective particles include one, two or more of metallic silver particles, metallic aluminum particles, metallic platinum particles or metallic palladium particles.

In one embodiment, the reflective layer has a thickness greater than or equal to 1 μm.

In one embodiment, each of the plurality of cylindrical lenses has a width in a range of 100 μm to 500 μm.

In one embodiment, the Fresnel structure includes a plurality of prism structures arranged in concentric annular rings, the plurality of prism structures having their respective heights gradually decreasing in a direction facing towards a center of the concentric annular rings, and having their respective inclination angles gradually increasing in the direction facing towards the center of the concentric annular rings.

In one embodiment, the plurality of cylindrical lenses scatters the light from the Fresnel structure such that the scattered light is within a preset horizontal angle range, and the preset horizontal angle is in a range of 25 degrees to 35 degrees.

In one embodiment, the base layer is made of a material including a resin and a coloring agent added to the resin, and the coloring agent absorbs at least a portion of the ambient light.

A manufacturing method for a projection screen includes steps of:
    providing a base layer;
    forming a Fresnel structure on a side of the base layer;
    forming a cylindrical lens layer on another side of the base layer;
    forming a reflective layer on a side of the Fresnel structure facing away from the base layer; and
    forming a light-absorbing layer on a side of the reflective layer facing away from the Fresnel structure, the light-absorbing layer being formed by coating a side of the reflective layer facing away from the Fresnel structure with a light-absorbing material and then curing the light-absorbing material.

The step of forming the reflective layer on the side of the Fresnel structure facing away from the base layer includes:
    coating a threaded surface on a side of the Fresnel structure facing away from the base layer with a mixture of reflective particles and a binder; and
    curing the mixture of the reflective particles and the binder by means of photocuring or heat curing to form the reflective layer.

In one embodiment, the step of forming the Fresnel structure on the side of the base layer includes:

coating the side of the base layer with a resin layer, transferring a mold containing a Fresnel structure on the resin layer in a Roll to Roll manner to form the Fresnel structure on the resin layer; and curing the resin layer to form the Fresnel structure.

In one embodiment, the step of forming the cylindrical lens layer on another side of the base layer includes:

coating another side of the base layer with a cylindrical lens material layer, transferring a mold containing a cylindrical lens layer structure on the cylindrical lens material layer in a Roll to Roll manner to form a plurality of cylindrical lenses; and curing the cylindrical lens material layer to form a plurality of cylindrical lenses.

Compared with the related art, the reflective layer can control the reflected light to be scattered within a certain preset solid angle range, so that the light efficiency and uniformity of the projection screen can be increased, and the scattered light is further scattered by the cylindrical lens layer of the projection screen, which can make the emitted light more uniform, improve the contrast and avoid glare. In particular, the cylindrical lens layer can expand only the horizontal viewing angle without expanding the perpendicular viewing angle, thereby optimizing the viewing angle of the screen and improving the utilization rate of light energy.

Further, the reflective layer is further provided with a light-absorbing layer for absorbing ambient light transmitted through the reflective layer, so that the contrast of the image displayed by the projection screen can be improved. Still further, since the reflective layer and the light-absorbing layer sequentially completely cover the threaded face of the entire Fresnel structure, the projection screen can absorb ambient light in various directions, thereby improving the contrast of the projected image. In addition, the colored base layer can also enhance the absorption of ambient light and improve the contrast of the projected image.

Further, the reflective layer may be formed by coating the Fresnel structure with a mixture of reflective particles and binder and then performing curing. Since the process of coating the reflective layer is simple and easy to operate, the manufacturing process of the projection screen is simple, and the manufacturing cost can be reduced. In addition, the light-absorbing layer can also be formed by coating the reflective layer with a light-absorbing material and then performing curing, such that the projection screen also has advantages of simple process and low manufacturing cost.

In particular, it can be understood that by changing the particle size of the reflective particles, the mixing ratio of the reflective particles to the binder, the wavelength of the curing light, the heat curing temperature of the reflective layer and the like, the surface roughness and the particle dimension of the reflective layer are controlled, so that the scattering angle of the reflected light can be controlled, causing the reflected light to be within the preset solid angle range, so as to improve light efficiency and uniformity. Moreover, it is not easy for the reflective layer obtained by the above process to fall off, and the operation is simple, and the cost is low.

Beneficial Effects of the Present Disclosure

Beneficial Effects

In summary, since the cylindrical lens dimensions of the cylindrical lens layer and the Fresnel structure, and the prism dimension of the Fresnel structure can be precisely controlled, the projection screen can also be precisely controlled for light propagation, so that the projected image of the projection screen is better. In addition, the projection screen obtained by the above manufacturing method also has the advantage of being bendable and easy to transport.

DESCRIPTION OF SYMBOLS OF MAIN COMPONENTS

Figure 1:
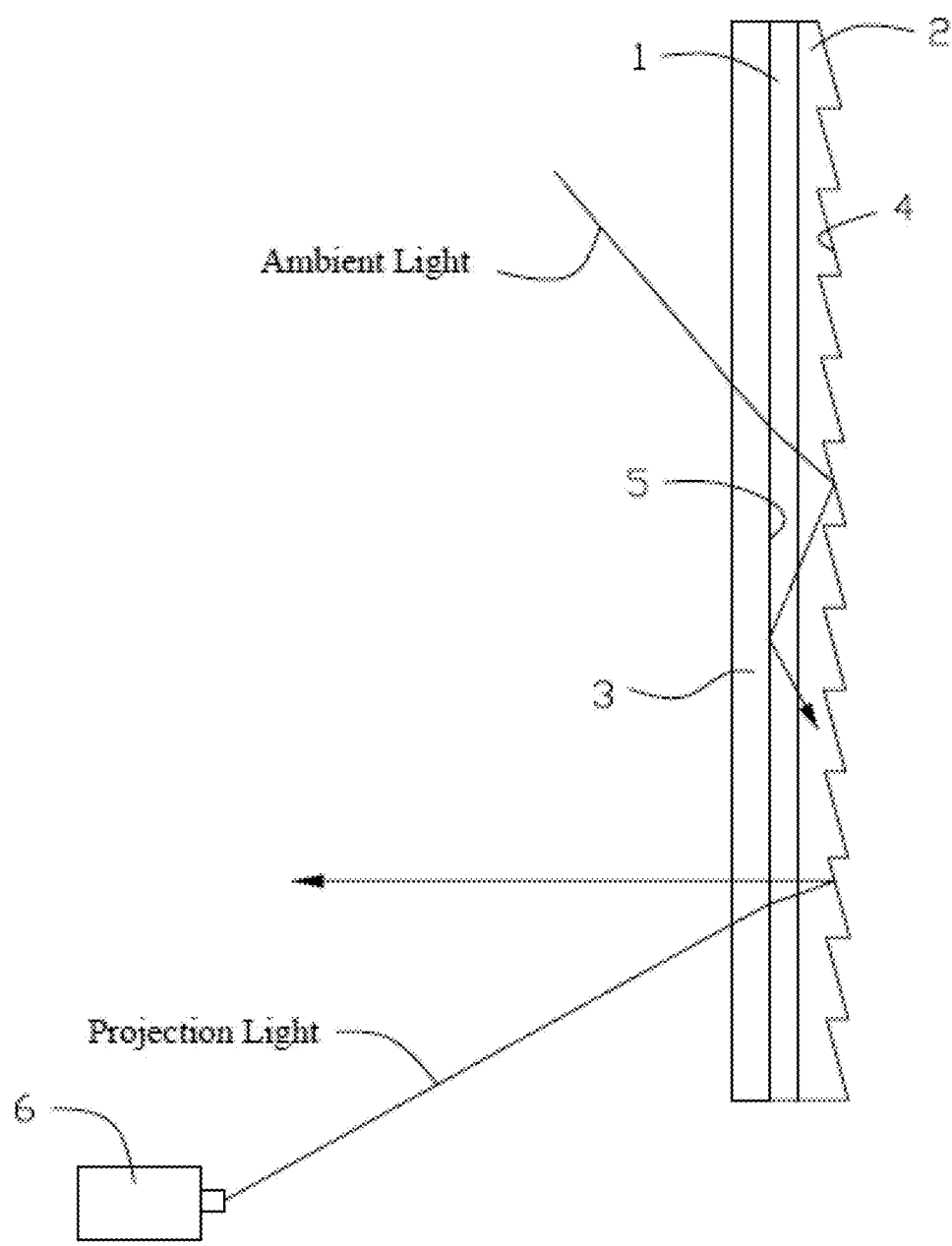
FIG. 1 is a structural schematic diagram of a projection screen.

Projection screen—10
Projector—20, 6
Viewer—30
Projection system—40
Cylinder—50
Cylindrical lens layer—100, 3
Cylindrical lens—100a
Base layer—101, 1
Fresnel structure—102, 2
Second right-angle side—105
Hypotenuse—104
Reflective layer—103
Reflective particle—1031
Binder 1032
Light-absorbing layer—106
Step—S1, S2, S3, S4, S5
Reflective surface—4
Surface—5
Direction—X
Horizontal angle range—H
Solid angle range—F
Incident light—I
Reflected light—R, R'
Incident point—P1, P2

The present disclosure will be further illustrated by the following detailed description in conjunction with the accompanying drawings.

DESCRIPTION OF EMBODIMENTS

In a reflective projection screen, ambient light has a large influence on quality of a projected image, such as reducing image contrast, while a projector with high light intensity can reduce the influence of ambient light on the quality of the projected image and improve the contrast. However, at first, the projector with high light intensity does not save energy, and more importantly, it is easy to cause phenomenon such as glare due to uneven light.

In addition, there are currently the following ways to improve contrast of a front projection screen: 1) selectively coating a light-absorbing layer in a specific region of a Fresnel structure of a reflective screen; 2) causing ambient light to have total reflection inside the screen; 3) using an active layer to reflect or absorb light of different polarization states; and 4) providing a light-absorbing structure such as a colored layer in a transparent structure of the screen such as a scattering layer. The first two ways have limitations on the incidence angle of the ambient light, and only ambient light incident in a specific direction can be fully absorbed; the polarization projection of the third way will reduce the quality of the displayed image, and can only reduce the ambient light by half, which is difficult to manufacture and costly. The last one is usually implemented together with the first three, and technical problems such as incomplete absorption of ambient light, difficulty in production, and high cost also exist as in the above three ways.

However, it can be seen from analysis that in the projection system, a position of an audience is often relatively fixed. It is desired that the reflected light of the image displayed on the projection screen by the projection system is only reflected to an audience region, while the reflected light to other invalid regions is reduced, thereby increasing the efficiency of the projection system and increasing the brightness of the image on the projection screen as seen by the audience. Generally, an emergence angle of the reflected light actually has emergence angles in both the horizontal and vertical directions, and the viewing angle in the horizontal direction is larger than the viewing angle in the perpendicular direction. Therefore, it is generally conceivable to add random microstructures to a surface of the projection screen by physical (such as shot peening) or chemical (such as etching) method and use a certain control method to count the gain of the microstructure to a certain emergence angle, so that a purpose of controlling the emergence angle of the reflected light by the microstructure is achieved. However, it is difficult to control the morphology, distribution and size of the microstructures in the above method, and the above microstructures also have a problem of being difficult to process.

In addition, as for the reflective layer on the Fresnel structure, although spraying, plating or the like may be employed, the structure formed by spraying scatters light in the way of Gaussian scattering, which cannot control the scattering angle of light well, and a thin film formed by plating has a problem of being easily peeled off.

The above problems will be described in detail below in combination with several examples.

In a technical solution of a projection screen in which ambient light is eliminated, a side of the projection screen surface close to a viewer is a light-shielding layer. A surface of the light-shielding layer is provided with parallel micro ribs extending horizontally. The micro rib has a triangular cross section, and an upper surface of the micro rib is coated with a light-shielding layer. On a side of the light-shielding layer facing away from the viewer, there is a reflective structural unit of the screen. In this technical solution, the projection screen can only absorb the light beam incident from above the projection screen, and when the incident light is projected from other directions onto the projection screen, these horizontal micro ribs cannot absorb the ambient light well, which is not conducive to improving light utilization rate and contrast.

Further, referring to FIG. 1 for another technical solution in which the reflective surface is a projection screen having a circular Fresnel structure. FIG. 1 is a cross-sectional diagram of the projection screen. The projection screen includes a light-transmissive base layer 1, a Fresnel structure 2 located on a back surface of the base layer 1, a reflective surface 4 located on a side of the Fresnel structure 2 facing away from the base layer, and a cylindrical lens layer 3 provided on a surface of the base layer 1 facing towards an audience and used for improving diffusivity in the horizontal direction. Light from a projector 6 passes through the base layer 1 and is reflected by the reflective surface 4 to a region where a viewer is located. Ambient light above the projection screen is totally reflected on one surface 5 of the base layer 1 after transmitting through the base layer 1 and being reflected by the reflective layer 4 and is finally absorbed by the colored base layer 1. However, since the absorption of the ambient light is mainly based on the occurrence of total reflection on the surface 5 of the base layer 1, an incidence angle of the ambient light that can be absorbed by the base layer 1 is limited. Namely, there are many cases where it is difficult for the ambient light that does not conform to the incidence angle to be absorbed. It is thus clear that the technical solution is also disadvantageous for the improvement of light utilization efficiency and contrast.

Further, in a technical solution of a reflective projection screen having a multi-layer structure, the projection screen sequentially includes, in an order from the projector side to the back, a protective layer, a diffusion layer, a base layer, a Fresnel lens layer, a reflective layer and a protective layer that are coated on an inclined surface of the Fresnel lens layer. A preparation process of the reflective layer is briefly described as follows: forming a metal film on the resin by vacuum coating, removing the resin layer and pulverizing the metal film, adjusting an aspect ratio of the metal sheet by controlling the degree of pulverization, mixing the pulverized metal sheet with binder to form a solution, spraying the solution on a surface of the Fresnel lens, and forming a reflective layer through evaporation. It is thus clear that the above manufacturing method for the reflective layer is complicated, and particularly, it is not easy to regulate and control the aspect ratio of the metal sheet. In addition, the diffusion layer is formed by coating diffusion beads on a surface of the resin. The disadvantage of this method lies in that both the diffusion layer and the base layer need to use binder, and more bonding interfaces will affect light propagation, i.e., will have an adverse effect on light propagation, thereby reducing image quality. In addition, it is difficult to control the coating uniformity of the diffusion beads and the dimension of the diffusion beads, and the diffusion layer formed by the above method has the same effect on light in the vertical and horizontal directions, so that it is impossible to have effect of simply expanding the viewing angle in the horizontal direction. It is thus clear that the preparation method for the above reflective layer is complicated and of high cost, and the projection screen obtained by the above preparation method has the technical problem of poor image quality.

In view of the above, it is necessary to provide a reflective projection screen, which has a certain emergence angle gain for the reflected light, a high light utilization rate, a better uniformity, an easy operation, a low manufacturing cost and the like, and a manufacturing method therefor.

Figure 2:
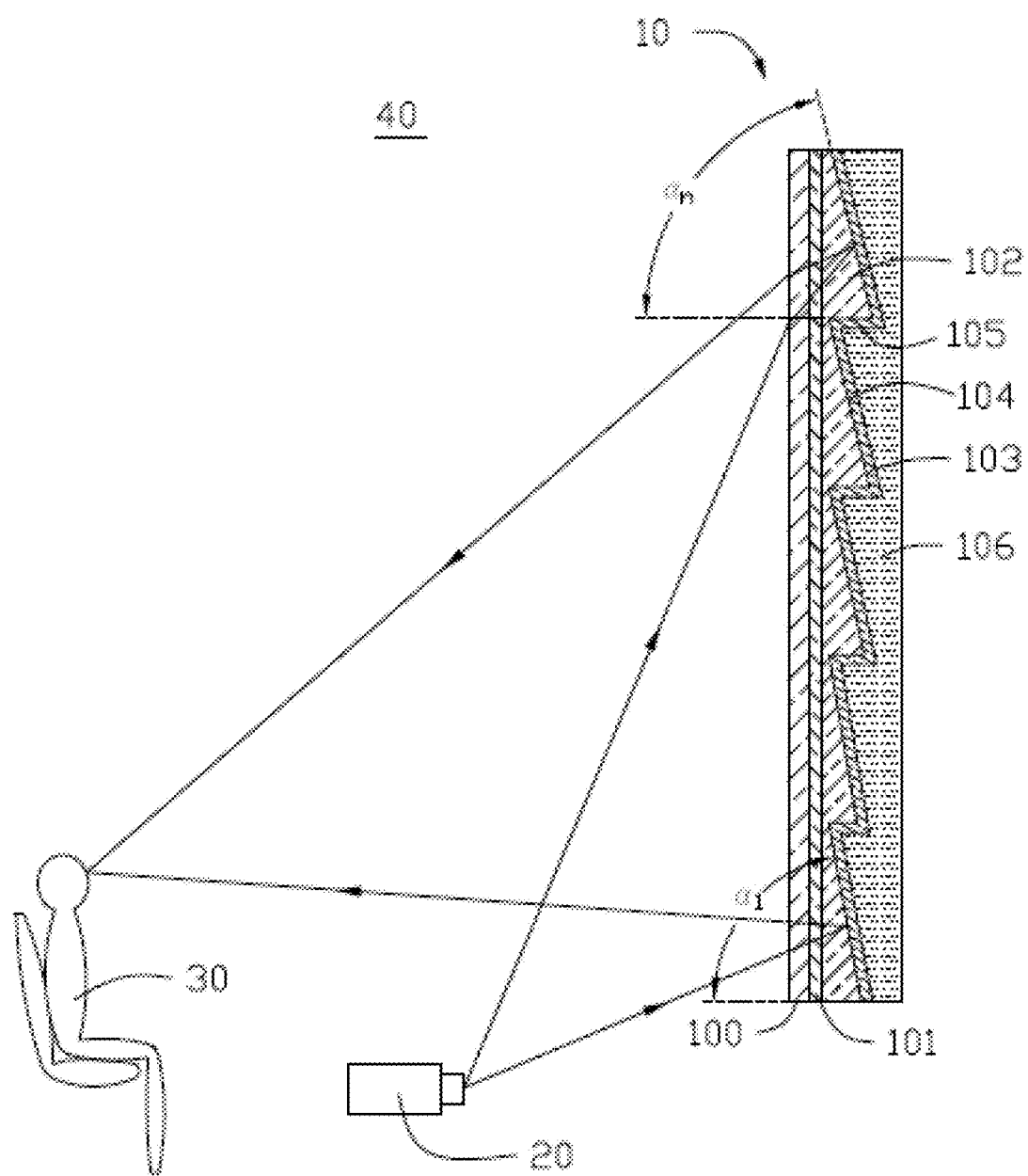
FIG. 2 is a structural schematic diagram of a projection screen of the present disclosure applied to a projection system.
Figure 3:
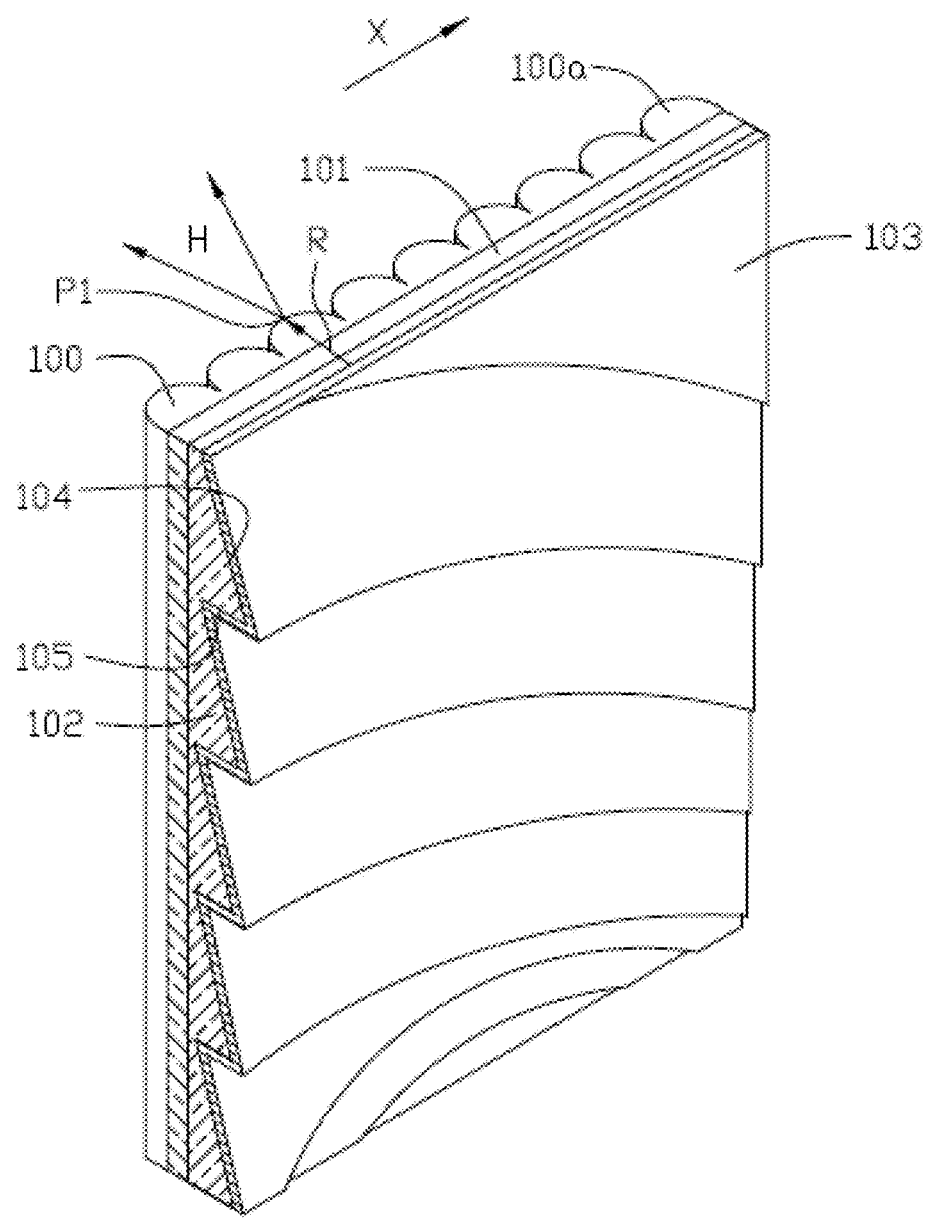
FIG. 3 is a partial perspective structural schematic diagram of the projection screen shown in FIG. 2.

Referring to FIG. 2 and FIG. 3, FIG. 2 is a structural schematic diagram of a projection screen 10 of the present disclosure applied to a projection system 40 and FIG. 3 is a partial perspective structural schematic diagram of the projection screen 10 shown in FIG. 2. The projection screen 10 includes a base layer 101, a cylindrical lens layer 100 formed on a side of the base layer 101 close to a viewer 30, a Fresnel structure 102 formed on a side of the base layer 101 facing away from the viewer 30, a reflective layer 103 formed on a side of the Fresnel structure 102 facing away from the base layer, and a light-absorbing layer 106 formed on a side of the reflective layer 103 facing away from the Fresnel structure 102.

The base layer 101 may include a resin material such as polycarbonate (such as acrylic urethane resin), and a black resin material can be adopted directly, or a light-transmissive resin material is adopted and then the light-transmissive resin material is colored. In one embodiment, a coloring agent may be added to the light-transmissive resin material of the base layer 101, such as injecting carbon black, so that the base layer 101 can absorb ambient light. In addition, a thickness of the base layer 101 can be selected according to actual needs. In the present embodiment, the thickness of the base layer 101 is greater than 100 µm.

In one embodiment, the base layer 101 may be prepared as follows: providing a temporary base layer, wherein the temporary base layer may be a PET thin film having a smooth surface; coating the colored light-transmissive resin material on the temporary base layer, wherein the colored light-transmissive resin material may be prepared by adding a coloring agent to the light-transmissive resin material, such as injecting carbon black into the acrylic urethane resin, to increase the light-absorbing rate to 20%, and the colored light-transmissive resin material may have a coating thickness greater than 100 µm; curing the colored light-transmissive resin material to form the base layer 101; and removing the temporary base layer.

The cylindrical lens layer 100 includes multiple cylindrical lenses 100a. The cylindrical lens 100a is used for scattering light from the Fresnel structure 102 to increase the viewing angle of the projection screen 10 in the horizontal direction. In this embodiment, an axis of the cylindrical lens 100a is perpendicular to the ground. In other words, the axis of the cylindrical lens 100a is perpendicular to the horizontal direction X, and the multiple cylindrical lenses 100a are sequentially connected.

In an embodiment, the cylindrical lens 100a scatters light from the Fresnel structure 102 such that the scattered light is within a preset horizontal angle range H perpendicular to an extending direction of the cylindrical lens 100a. The preset horizontal angle is in the range of 25 degrees to 35 degrees. It can be understood that the preset horizontal angle range H is within a horizontal angle range with the incident point P1 being a vertice in a horizontal plane perpendicular to the extending direction of the cylindrical lens 100a. The width of the cylindrical lens 100a may be in a range of 100 µm to 500 µm, i.e., greater than or equal to 100 µm and smaller than or equal to 500 µm.

In an embodiment, forming the cylindrical lens layer 100 on the base layer 101 may include the following steps: coating a cylindrical lens material layer on the other side of the base layer 101, transferring a mold containing a cylindrical lens layer structure on the cylindrical lens material layer in a Roll to Roll manner to form the multiple cylindrical lenses 100a; and curing the cylindrical lens material layer to form the multiple cylindrical lenses 100a. The cylindrical lens material may be a photocurable material (such as a UV curable binder).

The Fresnel structure 102 includes a smooth surface and a threaded surface located on a side opposite to the smooth surface. In the present embodiment, the smooth surface of the Fresnel structure 102 is in close contact with the base layer 101. The threaded surface side of the Fresnel structure 102 includes multiple prism structures, and each of the multiple prism structures protrudes towards a side facing away from the base layer 101 side, and a cross section perpendicular to an extending direction of the prism is a right triangle. The cross section of the right triangle includes a first right-angle side close to the base layer 101, a second right-angle side 105 perpendicular to the first right-angle side, and a hypotenuse 104 connected between the first right-angle side and the second right-angle side 105. An angle between the second right-angle side 105 and the hypotenuse 104 is set to an inclination angle $\alpha i$ (provided that the Fresnel structure 102 includes n prism structures, where n is a natural number, and i is a natural number greater than or equal to 1 and smaller than or equal to n). In the plane, the multiple prism structures are all circular arcs and arranged in concentric annular rings, and the widths of the multiple prism structures are equal (namely, the length L of each of the first right-angled sides is greater than or equal to 100 µm, if possible). However, the heights of the multiple prism structures (i.e., the length of the second right-angled side) may gradually decrease in a direction Z (e.g., in a direction from upper to lower of the projection screen 10) directed towards the center of the concentric annular rings. Thereby, the inclination angles $\alpha n$ to $\alpha 1$ of the multiple prism structures can be gradually increased in the direction Z.

Further, forming the Fresnel structure 102 on the base layer 101 may include the following steps:

calculating parameters of the Fresnel structure 102 according to a position relation of the projector 20 and the projection screen 10 in the projection system 40;

manufacturing a rigid mold containing a Fresnel structure according to the parameters obtained by calculation;

manufacturing a roll-shaped soft mold which can be used in the Roll TO Roll process and contains a Fresnel structure, using the rigid mold;

coating a resin layer on one side of the base layer 101, transferring the soft mold containing a Fresnel structure on the resin layer in a Roll to Roll manner to form the Fresnel structure 102 on the resin layer, wherein the material of the resin layer may be a UV curable binder; and curing the resin layer to form the Fresnel structure 102.

Figure 4:
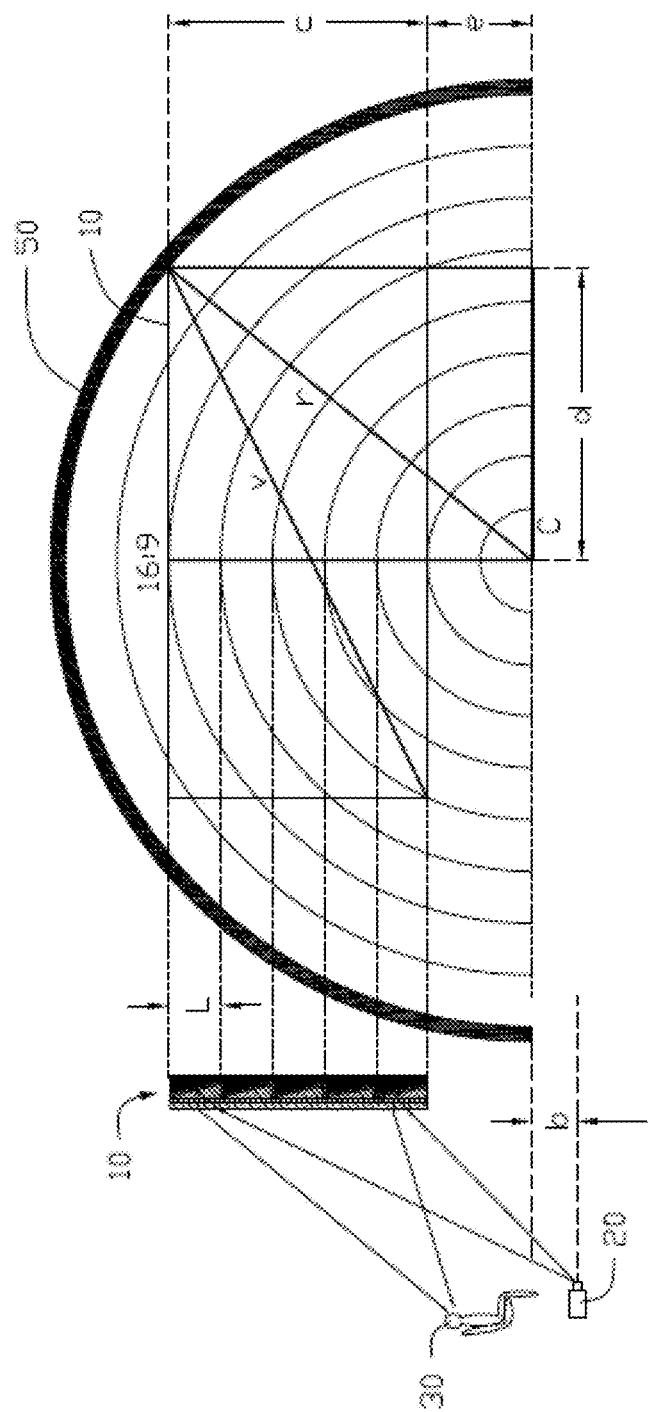
FIG. 4 is a schematic diagram of parameter calculation of a Fresnel structure shown in FIG. 2.

Referring to FIG. 4, which is a schematic diagram of parameter calculation of the Fresnel structure 102, in the Fresnel structure 102, widths of the multiple prism structures are all equal (namely, the length L of each of the first right-angled sides is equal to 100 µm, if possible), and the lengths of the second right-angle side 105 perpendicular to the base layer 101 gradually decrease in a direction Z facing towards the center of the concentric circle (e.g., from the upper of the projection screen 10 towards the lower of the projection screen 10). Further, the inclination angles $\alpha 1$ to $\alpha n$ of the Fresnel structure 102 are calculated according to the position relation of light from the projector 20 and the projection screen 10 of the projection system 40, so as to achieve that light from the projector 20 is reflected by the projection screen 10 to the region where the viewer 30 is located.

Figure 5:
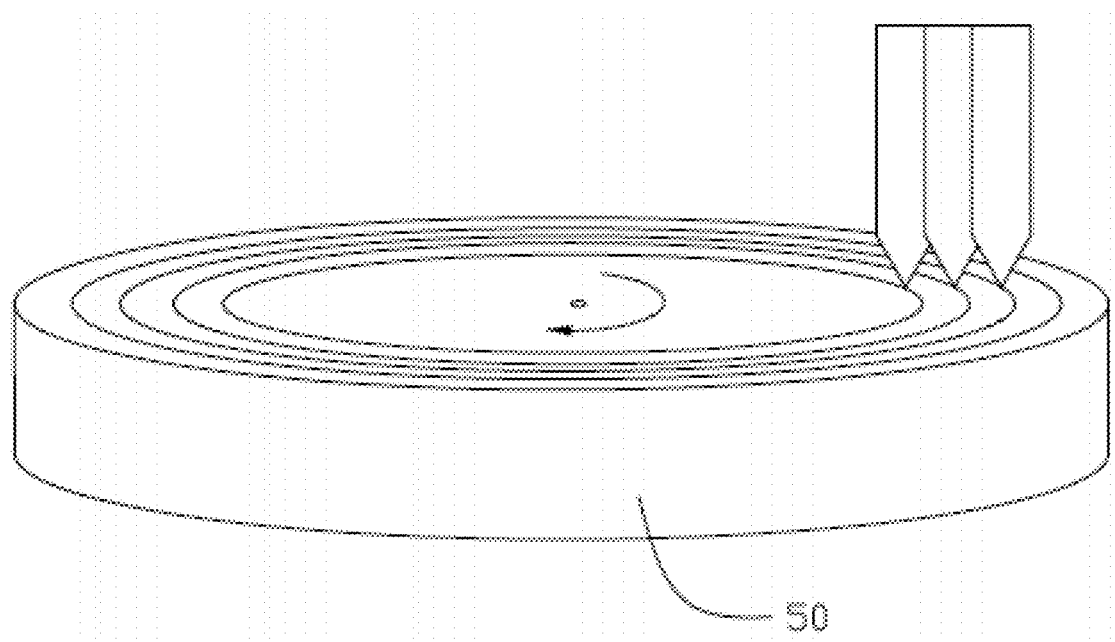
FIG. 5 schematically illustrates a process of processing a cylinder using an ultra-precision diamond lathe to prepare a rigid mold for manufacturing a Fresnel structure shown in FIG. 2.

Referring to FIG. 5, the rigid mold can be formed by processing the above annular ring shaped Fresnel structure on a bottom surface of a cylinder 50 (it is understood that the cylinder 50 can be made of, but not limited to, brass) using a super-precision diamond lathe. The radius of the cylinder 50 can be expressed in the following formula according to the illustration of FIG. 4: $r^2=d^2+(c+e)^2$, where r is the radius of the outermost prism structure, c is the height of the projection screen 10, d is one-half the width of the projection screen 10, e is the distance from the bottom side of the projection screen 10 to the center of the Fresnel annular ring, and the cylinder 50 has a radius of r+10 cm. In addition, it can be understood that the projection screen 10 is a wide screen having an aspect ratio of 16:9, where v represents the dimension of the projection screen 10, and (b+e) may represent the perpendicular distance from the bottom side of the projection screen 10 to the projector 20.

Further, after the preparation of the rigid mold having a Fresnel structure is completed, a soft mold is provided, and the rigid mold having a Fresnel structure is continuously pressed into the soft mold as shown in FIG. 5. The soft mold can be of a roll shape and wound on a rotatable shaft. The soft mold has a width of 125 cm, and a length thereof can be very long, which reaches up to the maximum length that can be achieved by the related art, and a thickness thereof can be in a range of 1 mm to 3 mm, such as 1.5 mm to 2.5 mm. It can be understood that the material of the soft mold can be silica gel.

The reflective layer 103 completely covers a surface of the Fresnel structure 102 facing away from the base layer 101, i.e., completely clouding over the surface where the second right-angled side 105 and the hypotenuse 104 are located. The thickness of the reflective layer 103 is uniform, such that a Fresnel structure is also formed on a side facing away from the Fresnel structure 102. The thickness of the reflective layer 103 may be greater than or equal to 1 μm.

Figure 6:
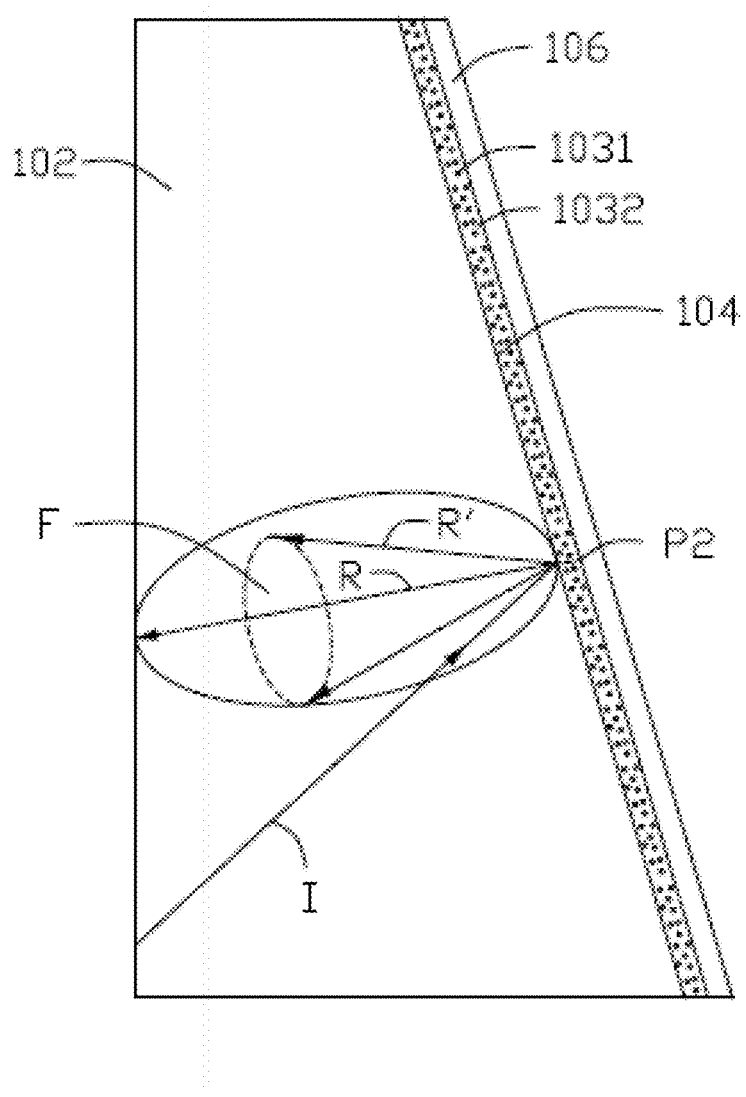
FIG. 6 schematically illustrates a solid angle range of reflected light of a reflective layer shown in FIG. 2.

The reflective layer 103 includes reflective particles 1031 and binder 1032 bonded to the reflective particles 1031. As shown in FIG. 6, the reflective layer 103 scatters and reflects incident light incident from the Fresnel structure 102 within a solid angle range F corresponding to the particle size of the reflective particles 1031 to form reflected light. In the present embodiment, the solid angle changes in a range of 5 to 15 degrees. The solid angle range F may be a cone angle range defined by the main reflected light R of the incident light I as a center. The main reflected light R is reflected light when the surface where the incident point P2 is located is a planar surface. It can be understood that the reflected light caused by the fact that the surface where the incident point P2 is located is an irregular surface includes not only the direction in which the main reflected light R is located, but the reflected light R' in other directions of the solid angle range F is also included.

The reflective particles 1031 include one, two or more of metallic silver particles, metallic aluminum particles, metallic platinum particles, and metallic palladium particles. The dimension of the particle size of the reflective particles is in the range of 0.02 to 5 μm. The binder material may be epoxy resin, PMMA, silica gel or the like, and the binder material does not need to be colored. It should be noted that when the reflective particles 1031 include metallic silver particles, it is not recommended to use silica gel as binder material, in order to avoid the poor water-isolation and oxygen-isolation ability of the reflective layer 103.

In an embodiment, the step of forming the reflective layer 103 on a side of the Fresnel structure 102 facing away from the base layer 101 includes:

coating the threaded surface on a side of the Fresnel structure 102 facing away from the base layer 101 with a mixture of the reflective particles 1031 and the binder 1032 (such as a mixture of silver powder or aluminum powder and the binder);

curing the mixture of the reflective particles 1031 and the binder 132 by means of photocuring or heat curing to form the reflective layer 103.

The surface roughness and particle size of the cured reflective layer 103 can be adjusted by adjusting the particle size of the reflective particles 1031 (silver powder or aluminum powder), the mixing ratio of the reflective particles 1031 (silver powder or aluminum powder) to the binder 1032, the coating thickness, the photocuring wavelength, the heat curing temperature, the curing time, the treatment of the threaded surface of the Fresnel structure 102 and so on, so as to control the scattering angle of the reflected light of the reflective layer 103, such that the reflective layer 103 reflects the incident light within a solid angle range F (such as a certain controllable cone angle).

The light-absorbing layer 106 completely covers the surface of the reflective layer 103 facing away from the Fresnel structure 102. The material of the light-absorbing layer 106 may be a carbon black material for absorbing ambient light transmitted through the reflective layer 103 to improve image contrast. It can be understood that the light-absorbing layer 106 can also be formed by coating the side of the reflective layer 103 facing away from the Fresnel structure 102 with a light-absorbing material (such as carbon black material) in a simple and easy-to-operate coating manner and then performing a curing process, such that the side of the light-absorbing layer 106 facing away from the reflective layer 103 may be planarized to form a planar surface.

Referring to FIG. 2 again, when the projection system 40 operates, the projector 20 emits projection light to the projection screen 10, and the projection light reaches the reflective layer 103 by sequentially passing through the cylindrical lens layer 100, the base layer 101 and the Fresnel structure 102. The reflective particles 1031 in the reflective layer 103 scatter and reflect the projection light to form reflected light, and controls the reflected light in the preset solid angle range F. The reflected light sequentially passes through the Fresnel structure 102 and the base layer 101, and is further scattered in the horizontal direction by the cylindrical lens layer 100 and then provided to the viewer 30 (where the cylindrical lens layer 100 can control the angle range of the reflected light to be within the preset horizontal angle range), while the projection light that is not reflected by the reflective layer 103 passes through the reflective layer 103 and is absorbed by the light-absorbing layer 106.

Figure 7:
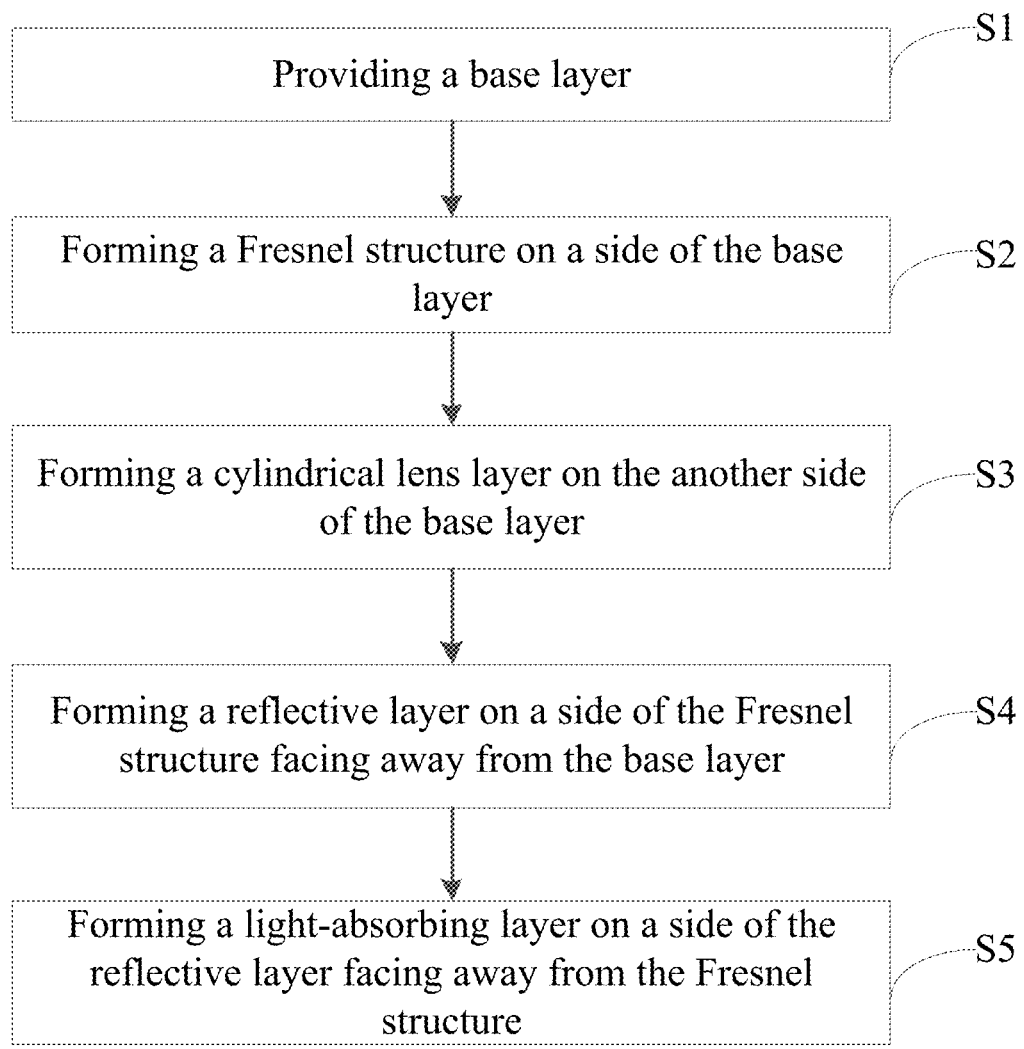
FIG. 7 is a flow chart of a manufacturing method for the projection screen shown in FIG. 2.

Referring to FIG. 7, FIG. 7 is a flowchart of a manufacturing method for the projection screen 10 shown in FIG. 2. The manufacturing method for the projection screen 10 includes the following steps S1, S2, S3, S4, and S5.

At Step S1, a base layer is provided.

In the step S1, the base layer 101 may be prepared as follows: providing a temporary base layer, wherein the temporary base layer may be a PET thin film having a smooth surface; coating the temporary base layer with the colored light-transmissive resin material, wherein the colored light-transmissive resin material may be prepared by adding a coloring agent to the light-transmissive resin material, such as injecting carbon black into the acrylic carbamate resin, so as to absorb ambient light, and the colored light-transmissive resin material may have a coating thickness greater than 100 μm; curing the colored light-transmissive resin material to form the base layer 101; and removing the temporary base layer.

At Step S2, the Fresnel structure 102 is formed on a side of the base layer 101.

Further, forming the Fresnel structure 102 on a side of the base layer 101 may include:

calculating parameters of the Fresnel structure 102 according to the position relation of the projector 20 and the projection screen 10 in the projection system;

manufacturing a rigid mold containing a Fresnel structure according to the parameters obtained by calculation;

manufacturing a roll-shaped soft mold which can be used in the Roll to Roll process and contains a Fresnel structure, using the rigid mold;

coating a side of the base layer 101 with a resin layer, transferring the soft mold containing a Fresnel structure on the resin layer in a Roll to Roll manner to form the Fresnel structure 102 on the resin layer, wherein the material of the resin layer may be a UV curable binder; and curing the resin layer to form the Fresnel structure 102.

Referring to FIG. 4. FIG. 4 is a schematic diagram of parameter calculation of the Fresnel structure 102. In the Fresnel structure 102, the widths of the multiple prism structures are all equal (namely, the length L of each of the first right-angled sides is equal to 100 μm, if possible), and the lengths of the second right-angle side 105 perpendicular to the base layer 101 gradually decrease in a direction Z facing towards the center of the concentric circle (e.g., from the upper of the projection screen 10 towards the lower of the projection screen 10). Further, the inclination angles α1 to αn of the Fresnel structure 102 are calculated according to the position relation of light from the projector 20 and the projection screen 10 of the projection system 40, so as to achieve that light from the projector 20 is reflected by the projection screen 10 to the region where the viewer 30 is located.

Referring to FIG. 5, the rigid mold can be formed by processing the above annular ring shaped Fresnel structure on a bottom surface of a cylinder 50 of brass (it is understood that the material of the cylinder 50 is not limited to brass) using a super-precision diamond lathe. The radius of the cylinder 50 can be expressed in the following formula according to the illustration of FIG. 4: $r^2=d^2+(c+e)^2$, where r is the radius of the outermost prism structure, c is the height of the projection screen 10, d is one-half the width of the projection screen 10, e is the distance from the bottom side of the projection screen 10 to the center of the Fresnel annular ring, and the cylinder 50 has a radius of r+10 cm. In addition, it can be understood that the projection screen 10 is a wide screen having an aspect ratio of 16:9, where v represents the dimension of the projection screen 10, and (b+e) may represent the vertical distance from the bottom side of the projection screen 10 to the projector 20.

Further, after the preparation of the rigid mold having a Fresnel structure is completed, a soft mold is provided, and the rigid mold having a Fresnel structure is continuously pressed into the soft mold as shown in FIG. 5. The soft mold can be of a roll shape and wound on a rotatable shaft. The soft mold has a width of 125 cm, and a length thereof can be very long, which can be the maximum length achieved by the related art, and a thickness thereof can be 1 mm to 3 mm, such as 1.5 mm to 2.5 mm. It can be understood that the material of the soft mold can be silica gel.

At Step S3, a cylindrical lens layer is formed on another side of the base layer.

Forming the cylindrical lens layer 100 on the base layer 101 may include the following steps: coating another side of the base layer 101 with a cylindrical lens material layer, transferring a mold containing the cylindrical lens layer structure on the cylindrical lens material layer in a Roll to Roll manner to form the multiple cylindrical lenses; and curing the cylindrical lens material layer to form multiple cylindrical lenses 100a. The cylindrical lens material may be a photocurable material (such as a UV curable binder).

At Step S4, the reflective layer 103 is formed on a side of the Fresnel structure 102 facing away from the base layer.

The step of forming the reflective layer 103 on a side of the Fresnel structure 102 facing away from the base layer 101 may include:

coating a threaded surface on a side of the Fresnel structure 102 facing away from the base layer 101 with a mixture of the reflective particles 1031 and the binder 1032 (such as a mixture of silver powder or aluminum powder and the binder);

curing the mixture of the reflective particles 1031 and the binder 1032 by means of photocuring or heat curing to form the reflective layer 103.

The surface roughness and particle size of the cured reflective layer 103 can be adjusted by adjusting the particle size of the reflective particles 1031 (silver powder or aluminum powder), the mixing ratio of the reflective particles 1031 (silver powder or aluminum powder) to the binder 1032, the coating thickness, the photocuring wavelength, the heat curing temperature, the curing time, the treatment of the threaded surface of the Fresnel structure 102 and so on, so as to control the scattering angle of the reflected light of the reflective layer 103, such that the reflective layer 103 reflects the incident light within a solid angle range F (such as a certain controllable cone angle).

At Step S5, the light-absorbing layer 106 is formed on a side of the reflective layer 103 facing away from the Fresnel structure 102.

It can be understood that in the step S5, the light-absorbing layer 106 can also be formed by coating the side of the reflective layer 103 facing away from the Fresnel structure 102 with a light-absorbing material (such as carbon black material) in a simple and easy-to-operate coating manner and then performing a curing process, such that the side of the light-absorbing layer 106 facing away from the reflective layer 103 may be planarized to form a planar surface.

Compared with the related art, the reflective layer 103 can control the reflected light to be scattered within a certain solid angle range, so that the light efficiency and uniformity of the projection screen 10 can be increased, and the scattered light is further scattered by the cylindrical lens layer 100 of the projection screen 10, which can make the emitted light more uniform, improve the contrast and avoid glare. In particular, the cylindrical lens layer 100 can expand only the viewing angle in the horizontal direction without expanding the viewing angle in the perpendicular direction, thereby optimizing the viewing angle of the screen and improving the utilization rate of light energy.

Further, the reflective layer 103 is further provided with a light-absorbing layer 106 for absorbing ambient light transmitted through the reflective layer, so that the contrast of the image displayed by the projection screen 10 can be improved. Still further, since the reflective layer 103 and the light-absorbing layer 106 sequentially completely cover the threaded surface of the entire Fresnel structure 102, the projection screen 10 can absorb ambient light in various directions, thereby improving the contrast of the projected image. In addition, the colored base layer 101 can also enhance the absorption of ambient light and improve the contrast of the projected image.

Further, the reflective layer 103 may be formed by coating the Fresnel structure 102 with a mixture of reflective particles and binder and then performing curing. Since the process of forming the reflective layer 103 by coating is simple and easy to operate, the manufacturing process of the projection screen 10 is simple, and the manufacturing cost can be reduced. In addition, the light-absorbing layer 106 can also be forming on the reflective layer 103 using a light-absorbing material and then performing curing, such that the projection screen 10 also has advantages of simple process and low manufacturing cost.

In particular, it can be understood that by changing the particle size of the reflective particles 1031, the mixing ratio of the reflective particles 1031 to the binder 1032, the wavelength of the curing light, the heat curing temperature of the reflective layer 103 and the like, the surface roughness and the particle dimension of the reflective layer 103 are controlled, so that the scattering angle of the reflected light R can be controlled, causing the reflected light to be within the solid angle range F, so as to improve light efficiency and uniformity. Moreover, it is not easy for the reflective layer 103 obtained by the above process to fall off, and the operation is simple, and the cost is low.

In summary, since the cylindrical lens dimension of the cylindrical lens layer 100 and the Fresnel structure 102, and the prism dimension of the Fresnel structure can be precisely controlled, the projection screen 10 can also be precisely controlled for light propagation, so that the projected image of the projection screen 10 is better. In addition, the projection screen 10 obtained by the above manufacturing method also has the advantage of being bendable and easy to transport.

The above is only embodiments of the present disclosure and is not intended to limit the scope of the disclosure. All the equivalent structure or equivalent process transformation made according to the specification and the drawings of the present disclosure or those directly or indirectly applied to other related technical field are equally included in the patent scope of the present disclosure.

What is claimed is:

1. A manufacturing method for a projection screen, comprising steps of:
   providing a base layer;
   forming a Fresnel structure on a side of the base layer;
   forming a cylindrical lens layer on another side of the base layer;
   forming a reflective layer on a side of the Fresnel structure facing away from the base layer; and
   forming a light-absorbing layer on a side of the reflective layer facing away from the Fresnel structure, the light-absorbing layer being formed by coating a side of the reflective layer facing away from the Fresnel structure with a light-absorbing material and then curing the light-absorbing material,
   wherein the reflective layer comprises reflective particles and a binder bonded to the reflective particles, and the reflective layer is configured to scatter and reflect, in a solid angle range corresponding to a particle size of the reflective particles, incident light incident from the Fresnel structure, to form reflected light, and
   wherein the step of forming the reflective layer on the side of the Fresnel structure facing away from the base layer comprises:
   coating a threaded surface on a side of the Fresnel structure facing away from the base layer with a mixture of the reflective particles and the binder; and
   curing the mixture of the reflective particles and the binder by means of photocuring or heat curing to form the reflective layer,
   wherein the reflective layer and the light-absorbing layer sequentially completely cover the threaded surface of the Fresnel structure.

2. The manufacturing method for a projection screen of claim 1, wherein the step of forming the Fresnel structure on the side of the base layer comprises:
   coating the side of the base layer with a resin layer, transferring a mold containing a Fresnel structure on the resin layer in a Roll to Roll manner to form the Fresnel structure on the resin layer; and
   curing the resin layer to form the Fresnel structure.

3. The manufacturing method for a projection screen of claim 2, wherein the step of forming the cylindrical lens layer on another side of the base layer comprises:
   coating another side of the base layer with a cylindrical lens material layer, using a mold containing a cylindrical lens layer structure to transfer on the cylindrical lens material layer in a Roll to Roll manner so as to form a plurality of cylindrical lenses constituting the cylindrical lens layer; and
   curing the cylindrical lens material layer.

4. A projection screen for receiving projection light from a projector and providing a projected image to a viewer, wherein the projection screen comprises a base layer, a cylindrical lens layer formed on a side of the base layer close to the viewer, a Fresnel structure formed on a side of the base layer facing away from the viewer and comprising a first side facing away from the base layer and a threaded surface opposite to the first side, a reflective layer formed on the first side of the Fresnel structure, and a light-absorbing layer formed on a side of the reflective layer facing away from the Fresnel structure, the reflective layer comprising reflective particles and a binder bonded to the reflective particles; the reflective layer is configured to scatter and reflect, in a solid angle range corresponding to a particle size of the reflective particles, incident light incident from the Fresnel structure, to form reflected light; the cylindrical lens layer comprises a plurality of cylindrical lenses each having an axis perpendicular to a horizontal direction and scattering light from the Fresnel structure to increase a viewing angle of the projection screen in the horizontal direction; and the light-absorbing layer is configured to absorb ambient light transmitted through the reflective layer, wherein the reflective layer and the light-absorbing layer sequentially completely cover the threaded surface of the Fresnel structure.

5. The projection screen of claim 4, wherein the particle size of the reflective particles is in a range of 0.02 µm to 5 µm, and the solid angle varies correspondingly in a range of 5 degrees to 15 degrees.

6. The projection screen of claim 4, wherein the reflective particles comprise one, two or more of metallic silver particles, metallic aluminum particles, metallic platinum particles or metallic palladium particles.

7. The projection screen of claim 4, wherein the reflective layer has a thickness greater than or equal to 1µm.

8. The projection screen of claim 4, wherein each of the plurality of cylindrical lenses has a width in a range of 100 µm to 500 µm.

9. The projection screen of claim 4, wherein the Fresnel structure comprises a plurality of prism structures arranged in concentric annular rings, the plurality of prism structures having their respective heights gradually decreasing in a direction facing towards a center of the concentric annular rings, and having their respective inclination angles gradually increasing in the direction facing towards the center of the concentric annular rings.

10. The projection screen of claim 4, wherein the plurality of cylindrical lenses scatters the light from the Fresnel structure such that the scattered light is within a preset horizontal angle range, and the preset horizontal angle is in a range of 25 degrees to 35 degrees.

11. The projection screen of claim 4, wherein the base layer is made of a material comprising a resin and a coloring agent added to the resin, and the coloring agent absorbs at least a portion of the ambient light.

12. A projection screen for receiving projection light from a projector and providing a projected image to a viewer, wherein the projection screen comprises a base layer, a cylindrical lens layer formed on a side of the base layer close to the viewer, a Fresnel structure formed on a side of the base layer facing away from the viewer, a reflective layer formed on a side of the Fresnel structure facing away from the base layer, and a light-absorbing layer formed on a side of the reflective layer facing away from the Fresnel structure, the reflective layer comprising reflective particles and a binder bonded to the reflective particles; the reflective layer is configured to scatter and reflect, in a solid angle range corresponding to a particle size of the reflective particles, incident light incident from the Fresnel structure, to form reflected light; the cylindrical lens layer comprises a plurality of cylindrical lenses each having an axis perpendicular to a horizontal direction and scattering light from the Fresnel structure to increase a viewing angle of the projection screen in the horizontal direction; and the light-absorbing layer is configured to absorb ambient light transmitted through the reflective layer, wherein the particle size of the reflective particles is in a range of 0.02 μm to 5 μm so that the solid angle varies correspondingly in a range of 5 degrees to 15 degrees.

13. The projection screen of claim 12, wherein the reflective particles comprise one, two or more of metallic silver particles, metallic aluminum particles, metallic platinum particles or metallic palladium particles.

14. The projection screen of claim 12, wherein the reflective layer has a thickness greater than or equal to 1μm.

15. The projection screen of claim 12, wherein each of the plurality of cylindrical lenses has a width in a range of 100 μm to 500 μm.

16. The projection screen of claim 12, wherein the Fresnel structure comprises a plurality of prism structures arranged in concentric annular rings, the plurality of prism structures having their respective heights gradually decreasing in a direction facing towards a center of the concentric annular rings, and having their respective inclination angles gradually increasing in the direction facing towards the center of the concentric annular rings.

17. The projection screen of claim 12, wherein the plurality of cylindrical lenses scatters the light from the Fresnel structure such that the scattered light is within a preset horizontal angle range, and the preset horizontal angle is in a range of 25 degrees to 35 degrees.

18. The projection screen of claim 12, wherein the base layer is made of a material comprising a resin and a coloring agent added to the resin, and the coloring agent absorbs at least a portion of the ambient light.

* * * * *